United States Patent [19]

Durand

[11] Patent Number: 4,970,756

[45] Date of Patent: Nov. 20, 1990

[54] ADJUSTABLE INTERNAL GUIDE ELEMENT FOR AN APPARATUS FOR CUTTING UP THE CARCASSES OF SLAUGHTERED ANIMALS, AND A CORRESPONDING METHOD

[75] Inventor: Lucien Durand, Baix, France

[73] Assignee: Mecaniques Lucien Durand, Baix, France

[21] Appl. No.: 461,284

[22] Filed: Jan. 5, 1990

[30] Foreign Application Priority Data

Jan. 6, 1989 [FR] France ................. 89 00295

[51] Int. Cl.⁵ .............................................. A22B 5/20
[52] U.S. Cl. ....................................... 452/160; 17/52
[58] Field of Search ..................................... 17/23, 52

[56] References Cited

U.S. PATENT DOCUMENTS

| | | | |
|---|---|---|---|
| 3,641,624 | 2/1972 | Aubert | 17/23 |
| 3,916,482 | 11/1975 | Kvilhaug | 17/23 |
| 4,262,388 | 4/1981 | Durrand et al. | 17/23 |
| 4,667,368 | 5/1987 | Menqi | 17/23 |

FOREIGN PATENT DOCUMENTS

| | | |
|---|---|---|
| OS2600766 | 7/1976 | Fed. Rep. of Germany . |
| 2576183 | 7/1986 | France . |
| 480802 | 12/1969 | Switzerland ............ 17/23 |

*Primary Examiner*—Willis Little
*Attorney, Agent, or Firm*—Bacon and Thomas

[57] ABSTRACT

Apparatus for cutting up carcasses in an abattoir, and in particular for cleaving them in two, comprises: a support beam securely mounted on a cleaving carriage via a pivot mount enabling the beam to pivot angularly about a pivot axis extending parallel to the cleaving direction; and adjustment means interposed between the cleaving carriage and the support beam to adjust the angular position of the beam about its pivot, and also to lock it in position. The apparatus is suitable for cutting up or cleaving in two the carcasses of slaughtered animals.

9 Claims, 6 Drawing Sheets

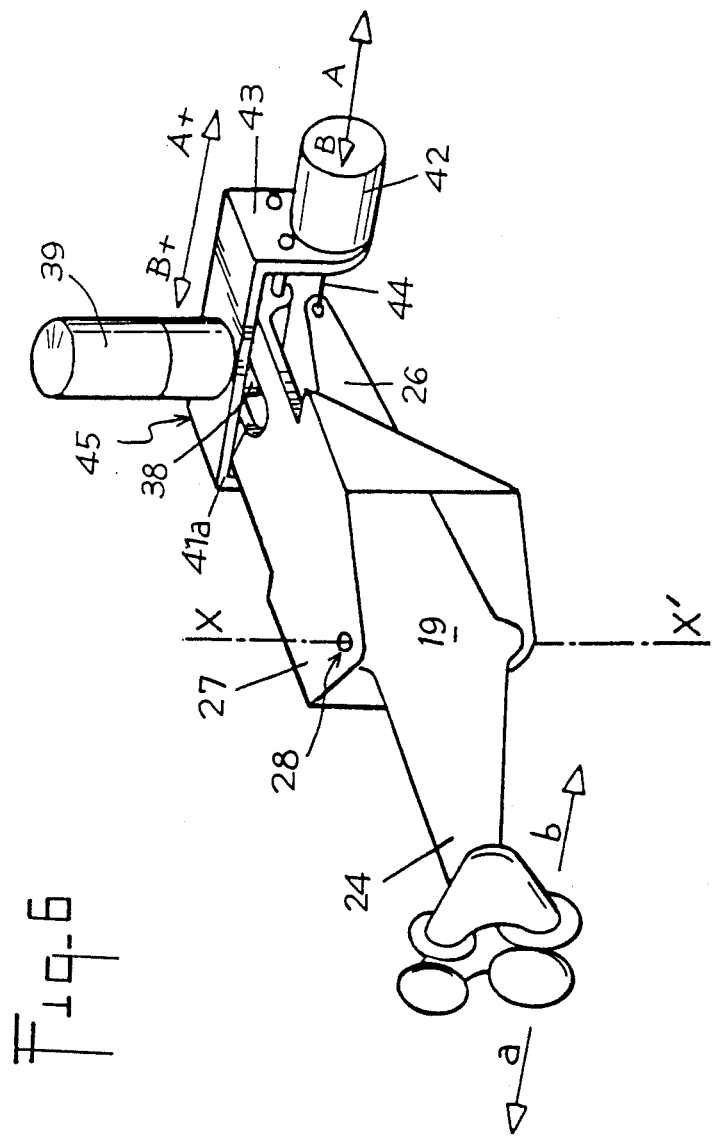

ADJUSTABLE INTERNAL GUIDE ELEMENT FOR
AN APPARATUS FOR CUTTING UP THE
CARCASSES OF SLAUGHTERED ANIMALS, AND
A CORRESPONDING METHOD

The present invention relates to the general technical field of apparatuses for cutting up or longitudinally cleaving the carcasses of slaughtered animals, and more particularly it relates to automated cleaving apparatuses for use with a conveyor system from which carcasses hang vertically.

BACKGROUND OF THE INVENTION

Of all of the operations to which the carcasses of slaughtered animals are subjected, be they pigs, cattle, or sheep, the stage in which the carcass is cut longitudinally is particularly important. The carcass needs to be cut longitudinally into two portions which are accurately equal, so as to obtain two half-carcasses in which the ratio of meat to bone is equivalent.

In the past, attempts have been made to satisfy this accurate cutting requirement by providing guidance systems for guiding the cutting instrument along the backbone of the animal. Thus, application DE-A-2 600 766 describes a cutting apparatus comprising a cleaving carriage guided vertically on a main frame so as to be capable of moving vertically and having two guide elements and a cutting instrument firmly mounted thereon. The guide elements are fixed at the ends of supports, and they comprise an outside guide constituted, for example, by a pair of wheels for resting against the outside face of the animal's back and thus being guided along its backbone; and an inside guide likewise constituted by a pair of wheels resting against the inside face of the animal and against its backbone, facing the wheels of the outside guide. By virtue of this assembly, it is possible to maintain the cutting implement in a substantially central position along the backbone.

This type of cutting apparatus generally provides two substantially equal half-carcasses. However, in operation, it is observed that these apparatuses suffer from major deterioration in the quality and accuracy of the cut as time goes on leading to carcasses being cut up asymmetrically. Continuous and prolonged use of such apparatuses gives rise, because of the assembly clearances of the various parts of the apparatus and the deformation or wear to which the cutting instrument is subjected, to a loss of the vertical symmetry of the original assembly as existed between the cutting instrument and the guide elements. This loss of symmetry causes the carcass to be cut up asymmetrically.

In addition, since these apparatuses are designed solely for performing symmetrical cutting operations, they are incapable of performing other types of cutting as required, in particular, by the controlled asymmetrical cutting that occurs when performing a "bacon" type cut.

An object of the invention is to remedy the drawbacks of the prior art and to solve the problem of controlling the accuracy of cutting up.

Another object of the invention is to provide a cutting up apparatus enabling good cutting accuracy to be retained in spite of the wear and the deformation to which the guide elements and cutting instruments are subjected.

Another object of the invention consists in providing a cutting up apparatus including elements necessary for obtaining cuts of controlled symmetry or asymmetry.

Another object of the invention is to provide a cutting up method enabling the symmetry with which a carcass is cleaved to be controlled and adjusted.

SUMMARY OF THE INVENTION

The invention satisfies these objects by providing a cutting up apparatus for cleaving the carcass of a slaughtered animal, in particular for use with a pig carcass, the apparatus comprising:

a cleaving carriage movably mounted on a frame to move back and forth in a cleavage-defining direction;

a cleaving guidance system fixed to the cleaving carriage and comprising an outside guide element for resting against the outside back face of the carcass and preferably against the backbone of the animal, and an inside guide element mounted at the end of a support beam fixed to the cleaving carriage, said element being intended to rest against the inside face of the carcass facing the outside guide element; and a cutting instrument fixed to the cleaving carriage and suitable for cleaving the carcass during motion of the cleaving carriage along the cleaving direction;

wherein:

the support beam is fixed to the cleaving carriage via a pivot mount enabling the support beam to pivot angularly about a pivot axis extending parallel to the cleaving direction; and adjustment means are interposed between the cleaving carriage and the support beam to adjust the angular position of the support beam about the pivot and to lock it in position.

The cutting up method of the invention is a method of cutting up the carcass of a slaughtered animal by cleaving it longitudinally using a cutting up system defining a cutting up plane, the method comprising:

moving the cleaving carriage to a working position in contact with the carcass;

putting the cleaving guidance system into position by placing inside and outside guide members in contact with the backbone of the animal carcass; and adjusting the position of the cutting up plane relative to the carcass by adjusting the angular position of a support beam for supporting the inside guide member.

BRIEF DESCRIPTION OF THE DRAWINGS

An embodiment of the invention is described by way of example with reference to the accompanying drawings, in which:

FIG. 6 is a perspective view of a variant embodiment including an actuator and an excentric.

DETAILED DESCRIPTION

Figure 1:
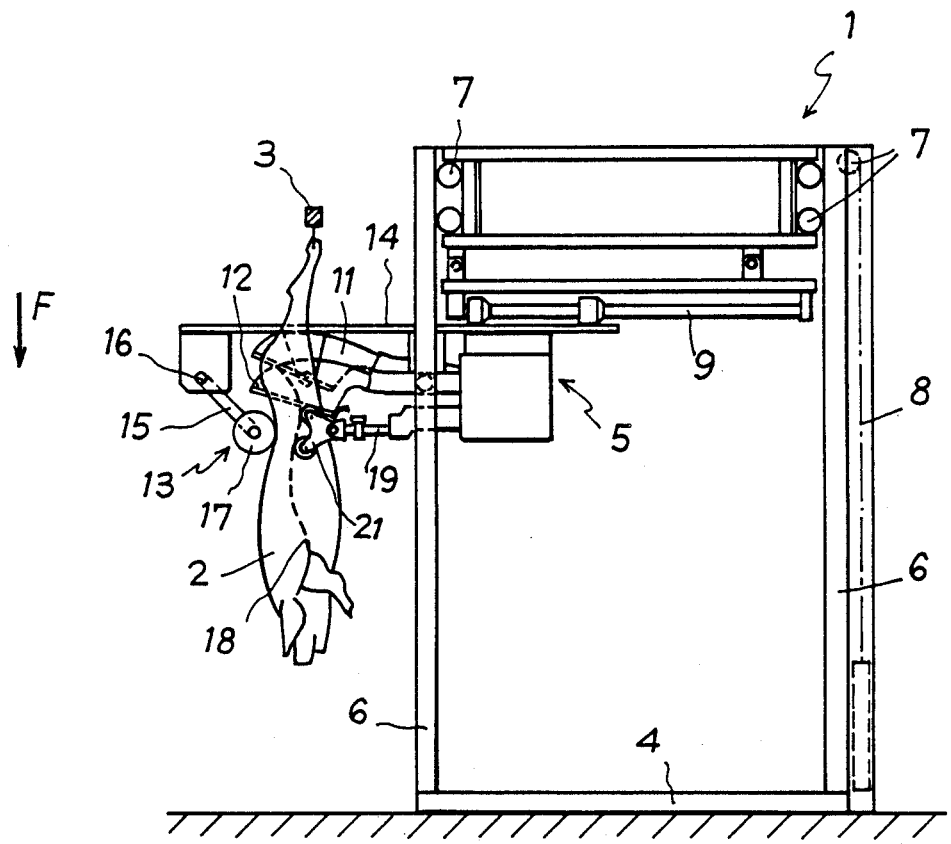
FIG. 1 is a general side view of a cutting up apparatus together with a hanging animal carcass.

FIG. 1 is a general view of a cutting up assembly 1 for cutting up a slaughtered animal by cleaving the carcass 2 longitudinally along a direction F, the carcass being brought to the cutting up assembly 1 by a conveyor rail 3 from which the animal is hung by its hind legs.

The carcass 2 as shown diagrammatically is a pig carcass, however it is obvious that the invention is equally applicable to carcasses of other types of animal, and in particular to sheep, cattle, and horse carcasses.

The cutting up assembly 1 comprises a main frame 4 on which a cleaving carriage 5 is mounted in such a manner as to be capable of sliding vertically. Vertical sliding of the cleaving carriage 5 may be ensured by a set of vertical slideways 6, running members 7, and cables 8.

The cleaving carriage 5 is also mounted on a secondary frame 9 in such a manner as to be capable of sliding horizontally. By virtue of these two sliding options, the guide carriage 5 is capable, in conventional manner, firstly of occupying a working position in contact with the carcass to be cut up when the carcass is presented to the cutting up assembly 1, and secondly of subsequently cutting up the carcass longitudinally as the carriage slides vertically.

A cutting instrument is securely mounted on the cleaving carriage 5, and in the example shown it is constituted by two blades 11 and 12 which are articulated relative to each other by means of an excentric device (not shown in FIG. 1). Other cutting instruments could naturally be envisaged without going beyond the scope of the invention.

The carcass 2 is positioned relative to the cleaving carriage 5 by a guidance system 13 comprising an outside element and an inside element. The term "outside" is used to refer to the outside or back surface of the animal carcass 2, whereas the term "inside" is used to refer to surfaces inside the envelope of the animal, i.e., for example, surfaces in contact with its gastric cavities.

The inside guide element in which the invention is more particularly embodied, is mounted at the end of a support beam 19 fixed to the cleaving carriage 5, and it comprises a guide body 21 which is constituted, for example, by two pairs of wheels 22 and 23.

Figure 2:
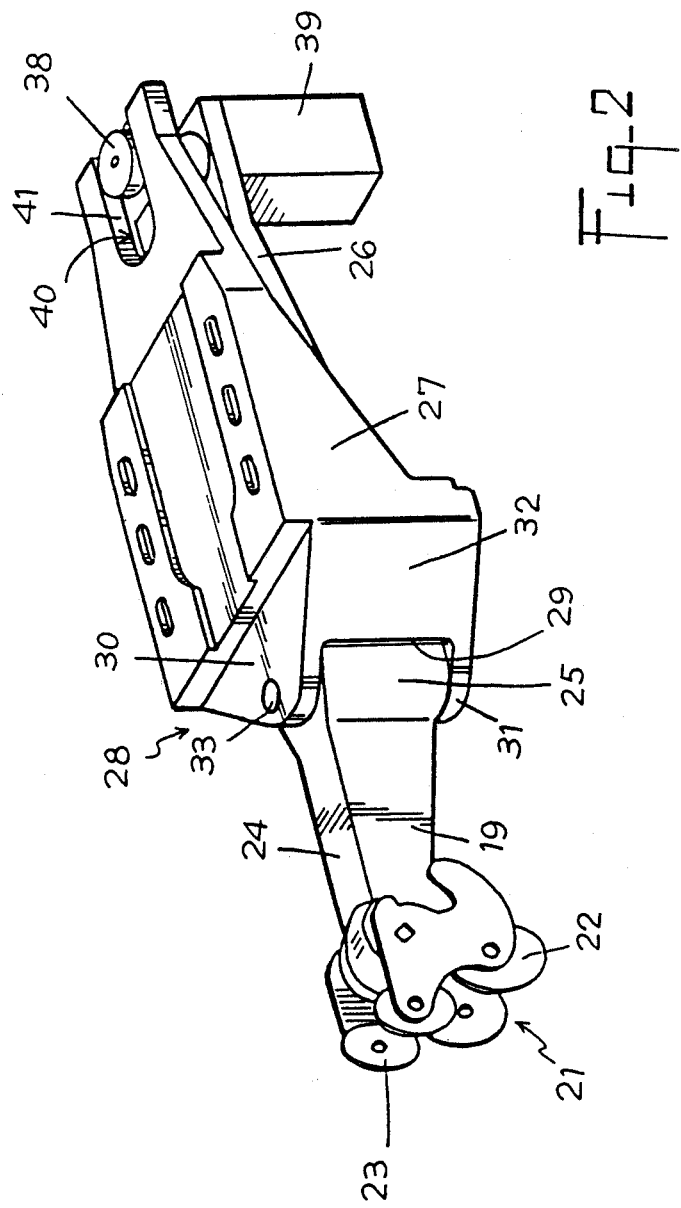
FIG. 2 is a perspective view of a preferred embodiment of a support beam of the invention.
Figure 3:
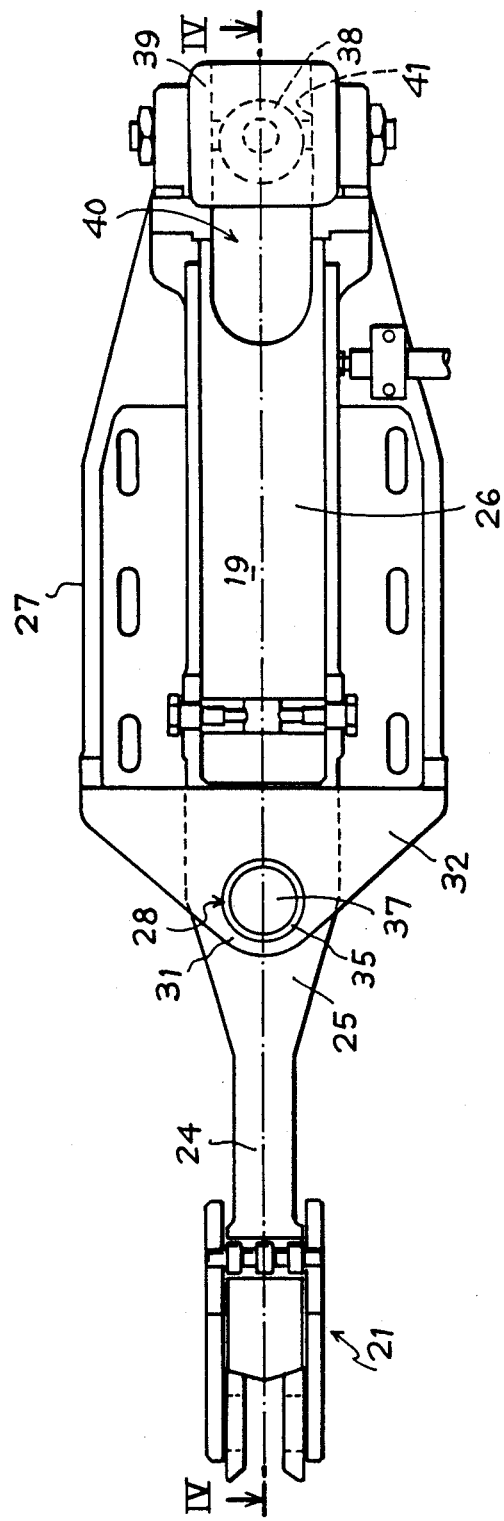
FIGS. 3 and 4 show the support beam of FIG. 2 as seen respectively from beneath and in section on line IV—IV of FIG. 3.

FIGS. 2 and 3 show a preferred, but non-limiting example of the way in which the inside guide element is mounted on the cleaving carriage 5.

The cross-section of the support beam 19 preferably varies from one end to the other. Thus, the front portion 25 supporting the guide body 21 has a cross-section which, for example, increases transversely while going away from the guide body 21. The front portion 24 continues with a substantially middle portion which constitutes a reinforcing zone 25. The beam 19 is advantageously provided at this point with a cross-section which increases progressively in directions which are radial relative to the longitudinal axis of the support beam 19. The end portion 26 may merely comprise a zone of rectangular cross-section whose thickness decreases from the reinforcement zone 25 followed by a portion of constant thickness or otherwise, e.g. a channel section portion.

The support beam 19 is securely mounted on the guide carriage 5 by means of a beam support block 27 which is likewise fixed to the guide carriage 5. Assembly is performed by means of a pivoting assembly 28 enabling the support beam 19 to occupy different angular positions about the pivot axis X—X'. Advantageously, the beam support block 27 is made in such a manner as to have a cut-out 29 in its front end directed towards the guide body 21 with the support beam 19 being engaged therein and having top and bottom edges respectively 30 and 31 constituting a fork 32.

Figure 4:
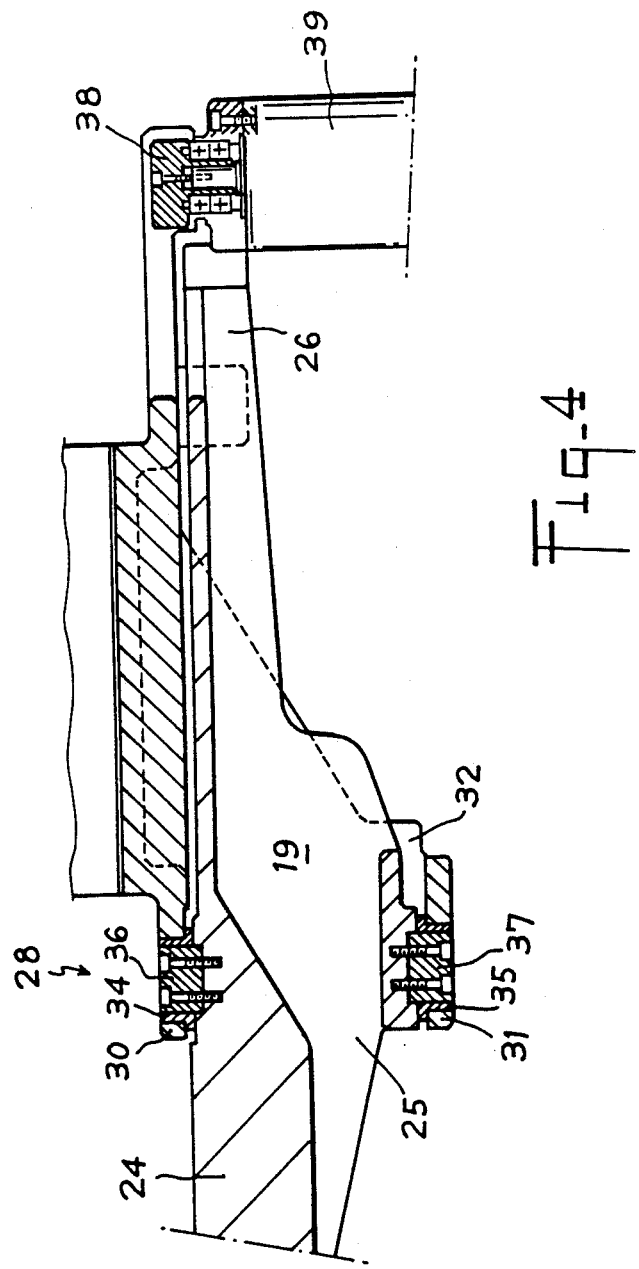

Each of the edges 30 and 31 is provided with an orifice 33 for enabling the pivoting assembly 28 to be installed, with the pivot preferably occupying the reinforcement zone 25 of the support beam 19. Various types of pivoting assembly could be used, and in FIG. 4 a pivot is shown comprising two sleeves 34 and 35 lining respective ones of the orifices 33 in the fork 32 and constituting bearing surfaces for two stub axles 36 and 37 fixed on the support beam 19 by means of screws, for example.

Figure 5:
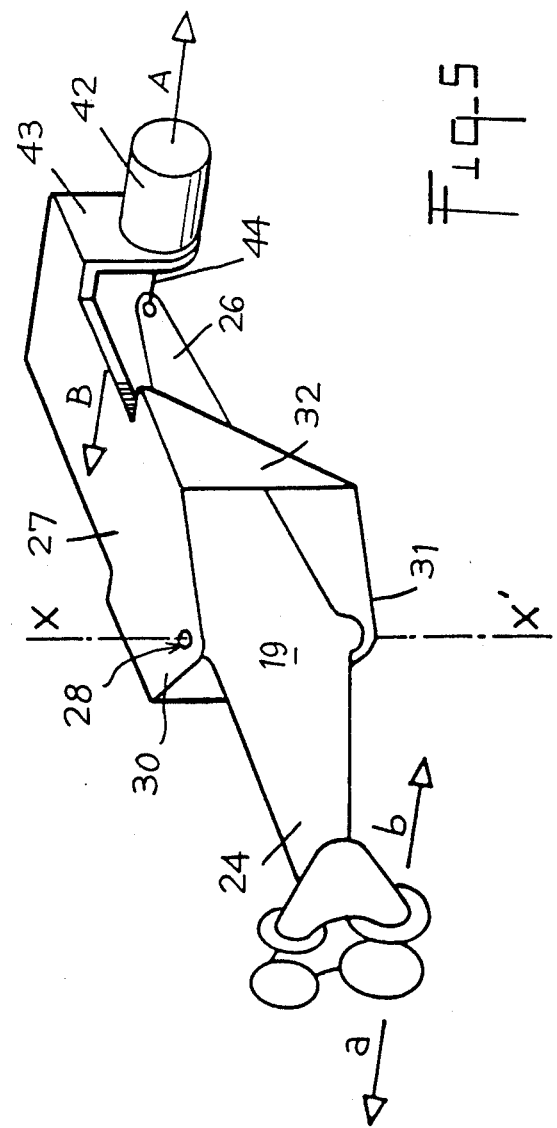
FIG. 5 is a diagram showing one particular way of controlling the motion of the support beam.

The support beam 19 may be pivoted about the axis X—X' of the pivot 29 and may be locked in position thereabout by various types of control and adjustment means, and FIGS. 2 and 5 show two preferred embodiments thereof.

FIG. 2 shows a variant constituted by an excentric together, for example, with a cam 38 driven by a drive member 39, e.g. an electric motor, and mounted to rotate excentrically on the drive shaft of the motor on the end portion 26 of the support beam 19. The cam 38 bears against the end of the beam support block 27 opposite from its end having the fork 32, where it is received in a slot 40 constituting a cam guide path 41.

FIG. 5 shows a variant in which an actuator 42 is mounted to bear against a side flange 43 extending vertically from the end portion of the beam support block 27. The rod 44 of the actuator 42 bears against the end portion 26 of the support beam 19 and is preferably directed along a direction which is orthogonal to the axis X—X'.

Applying the same principle, it is also possible to rotate the support beam 19 angularly by means of micrometer screws mounted directly or otherwise to bear against the beam 19 through the beam support block 27.

Similarly, without going beyond the scope of the invention, it is possible to invert the assembly of the controlling moving element (i.e. cam or actuator rod) which would then bear against the support beam 19 or against the beam support block 27, as the case may be. Means are also provided for remotely controlling the moving control element.

FIG. 6 shows another variant of the assembly associating an actuator and an excentric rotary cam. The rotary cam 38 may be mounted similarly to the variant shown in FIG. 2, i.e. bearing against a cam path 41a formed in a slot in the beam support block 27. The assembly constituted by the cam 38 and the motor 39 is fixed on a displaceable block 47 having a side flange 43 on which an actuator 42 having a rod 44 is mounted. The displaceable block 45 is mounted, for example, to slide relative to the beam support block 27 and the rod 44 bears against the end of the support beam 19. In this way, it is possible to control the angular position of the support beam 19 in two steps, initially by means of rapid rotation through large amplitudes corresponding to adjusting the position of the actuator 44 approximately (arrows A and B), and subsequently in performing finer adjustments by means of the rotary cam 38 causing the block 45 to move (arrows A+ and B+).

The support beam 19 is initially mounted in such a manner that its vertical plane of symmetry coincides with the longitudinal cleaving plane defined by the cutting instrument. In the normal operating position, the pairs of wheels 17, 22, and 23 are thus, in theory, disposed symmetrically about the backbone 18.

The cutting up apparatus operates as follows.

With an animal carcass 2 held stationary in front of the cutting up apparatus, the cleaving carriage 5 is moved to its working position by sliding horizontally and vertically, and simultaneously the cleaving guide members, in this case the wheels 17, 22, and 23 are put into place against the backbone 18 of the carcass 2. If during previous cleaves it has been observed that the longitudinal cut of the carcass is asymmetrical relative to the theoretical mid-cleavage plane, or alternatively if it is observed that the cleaving plane defined by the cutting instrument does not coincide with the vertical plane of symmetry of the inside guide member, the angular position of the support beam 19 is adjusted by actuating its control means, in particular the excentric cam 28, the actuator rod 44, or the micrometer screw, as the case may be. The excentric cam 28 acting on the cam path 41, or the rod 44 acting on the support beam 19 then exerts thrust or traction in direction A or B (FIG. 5) causing the support beam 19 to pivot. It is locked in position by the drive member 39 or 42.

Depending on the position of the pivot 28 on the support beam 19, the angular pivot amplitude of the inside guide body 21 is accentuated to a greater or lesser extent in a direction a or b opposite to the direction A or B, as the case may be.

The inside guide body 21 is thus repositioned in such a manner that the assembly clearances of the various parts of the cutting up apparatus, or the wear on the cutting portions of the cleaving device are taken up. It is thus possible at any moment in a manner which is particularly simple and quick to correct any possible asymmetry in the cleaving of a carcass by remote control and without interrupting abattoir throughput.

In addition, when it is necessary to cleave carcasses asymmetrically, e.g. in order to provide a "bacon" cut, the angular position of the support beam 19 is adjusted so that the guide body 21 in association with the cutting instrument ensures that the carcass is cleaved asymmetrically along a desired cleavage plane.

I claim:

1. Cutting up apparatus for cleaving the carcass of a slaughtered animal, in particular for use with a pig carcass, the apparatus comprising:
   a cleaving carriage movably mounted on a frame to move back and forth in a cleavage-defining direction;
   a cleaving guidance system fixed to the cleaving carriage and comprising an outside guide element for resting against the outside back face of the carcass and preferably against the backbone of the animal, and an inside guide element mounted at the end of a support beam fixed to the cleaving carriage, said element being intended to rest against the inside face of the carcass facing the outside guide element; and
   a cutting instrument fixed to the cleaving carriage and suitable for cleaving the carcass during motion of the cleaving carriage along the cleaving direction;
   wherein:
   the support beam is fixed to the cleaving carriage via a pivot mount enabling the support beam to pivot angularly about a pivot axis extending parallel to the cleaving direction; and
   adjustment means are interposed between the cleaving carriage and the support beam to adjust the angular position of the support beam about the pivot and to lock it in position.

2. Apparatus according to claim 1, wherein the pivot mount comprises firstly a beam support block connected to the cleaving carriage and including a cut-out at its end directed towards the inside guide element to constitute a fork in which said support beam is engaged, and secondly a pivot passing through the fork and the support beam.

3. Apparatus according to claim 2, wherein the adjustment means is interposed between the cleaving carriage and the support beam on the opposite side of the pivot to the side occupied by the inside guide element.

4. Apparatus according to claim 3, wherein the adjustment means is of the actuator type.

5. Apparatus according to claim 1, wherein the adjustment means includes an excentric.

6. Apparatus according to claim 5, wherein the excentric comprises a rotary cam excentrically mounted about its axis of rotation.

7. Apparatus according to claim 3, wherein the adjustment means comprises an adjustment screw, of the micrometer screw type.

8. A method of cutting up the carcass of a slaughtered animal by cleaving it longitudinally using a cutting up system defining a cutting up plane, the method comprising:
   moving the cleaving carriage to a working position in contact with the carcass;
   putting the cleaving guidance system into position by placing inside and outside guide members in contact with the backbone of the animal carcass; and
   adjusting the position of the cutting up plane relative to the carcass by adjusting the angular position of a support beam for supporting the inside guide member.

9. A method according to claim 8, wherein the position of the support beam is adjusted by remote control prior to cleaving each carcass.

* * * * *